US012680357B2

(12) United States Patent
Lister et al.

(10) Patent No.: US 12,680,357 B2
(45) Date of Patent: Jul. 14, 2026

(54) SLOW CLOSE PIVOT DOOR

(71) Applicant: KOHLER CO., Kohler, WI (US)

(72) Inventors: Mark Andrew Lister, Martin, TN (US); Nameer Shaaban, Lewiston, NY (US)

(73) Assignee: Kohler Co., Kohler, WI (US)

( * ) Notice: Subject to any disclaimer, the term of this patent is extended or adjusted under 35 U.S.C. 154(b) by 109 days.

(21) Appl. No.: 18/663,885

(22) Filed: May 14, 2024

(65) Prior Publication Data

US 2024/0384583 A1 Nov. 21, 2024

Related U.S. Application Data

(60) Provisional application No. 63/502,498, filed on May 16, 2023.

(51) Int. Cl.

*E05D 7/081* (2006.01)
*E05D 7/04* (2006.01)
*E05F 5/02* (2006.01)

(52) U.S. Cl.

CPC ............... *E05D 7/081* (2013.01); *E05D 7/04* (2013.01); *E05F 5/02* (2013.01); *E05Y 2900/114* (2013.01)

(58) Field of Classification Search

CPC ... E05D 7/04; E05D 7/043; E05D 2007/0438; E05D 2007/0446; E05D 2007/0453; E05D 2007/0484; E05D 7/081; E05D 7/08; E05D 7/086; E05D 2007/126; E05D 7/12; E05D 2015/586; A47K 2003/307; A47K 3/36; A47K 3/362; A47K 2003/367; E05Y 2600/312; E05Y 2600/10; E05Y 2600/14; E05Y 2900/114; E05F 5/02

USPC .............................................................. 4/607

See application file for complete search history.

(56) References Cited

U.S. PATENT DOCUMENTS

| | | | | | |
|---|---|---|---|---|---|
| 2,698,677 | A * | 1/1955 | Tadd | A47K 3/36 | 49/501 |
| 3,583,464 | A * | 6/1971 | Johnson, Jr. | E05D 15/264 | 160/206 |
| 4,035,957 | A * | 7/1977 | Roloff | A47K 3/286 | 16/382 |
| 4,375,736 | A * | 3/1983 | Teckchandani | A47K 3/36 | 49/390 |
| 4,416,086 | A * | 11/1983 | Niekrasz | E05D 7/081 | 49/501 |
| 4,754,524 | A * | 7/1988 | Bullock | E05D 7/081 | 16/273 |
| 4,956,940 | A * | 9/1990 | Touton, III | E06B 3/9632 | 49/467 |
| 5,205,072 | A * | 4/1993 | Eutebach | E05D 7/04 | 16/382 |
| 5,239,728 | A * | 8/1993 | Redman | E05D 7/0027 | 16/244 |

(Continued)

FOREIGN PATENT DOCUMENTS

| | | | | |
|---|---|---|---|---|
| AU | 619412 B2 * | 1/1992 | E05D 7/083 |
| DE | 10205692 A1 * | 8/2003 | E05D 7/0415 |

*Primary Examiner* — Jeffrey O'Brien
(74) *Attorney, Agent, or Firm* — Husch Blackwell LLP

(57) ABSTRACT

A pivot door system is provided that may include a door, a doorframe, and a hinge attached to the door. The doorframe may include a header, which may include a track system. The hinge may include a soft close mechanism. The hinge may be engaged with and securable at a plurality of positions along the track system of the header.

20 Claims, 3 Drawing Sheets

(56) References Cited

U.S. PATENT DOCUMENTS

| | | | | |
|---|---|---|---|---|
| 5,483,770 | A * | 1/1996 | Marinoni | E05D 7/0423 16/229 |
| 6,418,590 | B1 * | 7/2002 | Nipper | E05D 15/264 16/229 |
| 6,618,871 | B2 * | 9/2003 | Kopacz | E05D 7/081 4/607 |
| 6,643,898 | B1 * | 11/2003 | Cameron | E05F 1/061 16/382 |
| 6,925,685 | B2 * | 8/2005 | Chen | E05D 5/0246 16/241 |
| 9,518,419 | B2 * | 12/2016 | Johnson | E06B 3/36 |
| 9,675,215 | B2 * | 6/2017 | Corpuz, Jr. | A47K 3/36 |
| 10,060,168 | B2 * | 8/2018 | Corpuz, Jr. | E05D 7/081 |
| 10,273,731 | B2 * | 4/2019 | Dries | E05F 1/1292 |
| 10,422,175 | B2 * | 9/2019 | Bacchetti | E05D 5/0246 |
| 10,435,931 | B2 * | 10/2019 | Su | E05F 1/1253 |
| 10,662,688 | B2 * | 5/2020 | Bacchetti | E05D 11/08 |
| 10,914,105 | B2 * | 2/2021 | Ridilla | E05D 7/04 |
| 11,697,954 | B2 * | 7/2023 | Jones | E05D 7/04 312/326 |
| 11,905,749 | B2 * | 2/2024 | Benedetti | E05F 3/10 |
| 2018/0002958 | A1 * | 1/2018 | Mironchuk | E05D 7/081 |
| 2024/0172898 | A1 * | 5/2024 | Liu | A47K 3/34 |

* cited by examiner

SLOW CLOSE PIVOT DOOR

CROSS-REFERENCE TO RELATED APPLICATION

The present application claims priority to U.S. Provisional Patent Application No. 63/502,498, filed May 16, 2023, entitled, "SLOW CLOSE PIVOT DOOR," the entire contents of which are hereby incorporated by reference.

BACKGROUND

Shower doors are commonly used in the shower industry, and some of such shower doors pivot to open. To prevent the pivot doors from slamming shut, some pivot doors include soft close mechanisms that are generally positioned at an upper mount on a doorframe header. However, such soft close mechanisms generally must be installed at a preselected location along the header. Headers are built specifically for shower doors of a pre-determined size, and the soft close mechanism is located in a static, specific location along the header. Headers are therefore pre-built to accept a soft close pivot mechanism at a pre-determined location. As such, a need exists for pivot doors with soft close mechanisms that can be positioned anywhere along the header.

Figure 1:
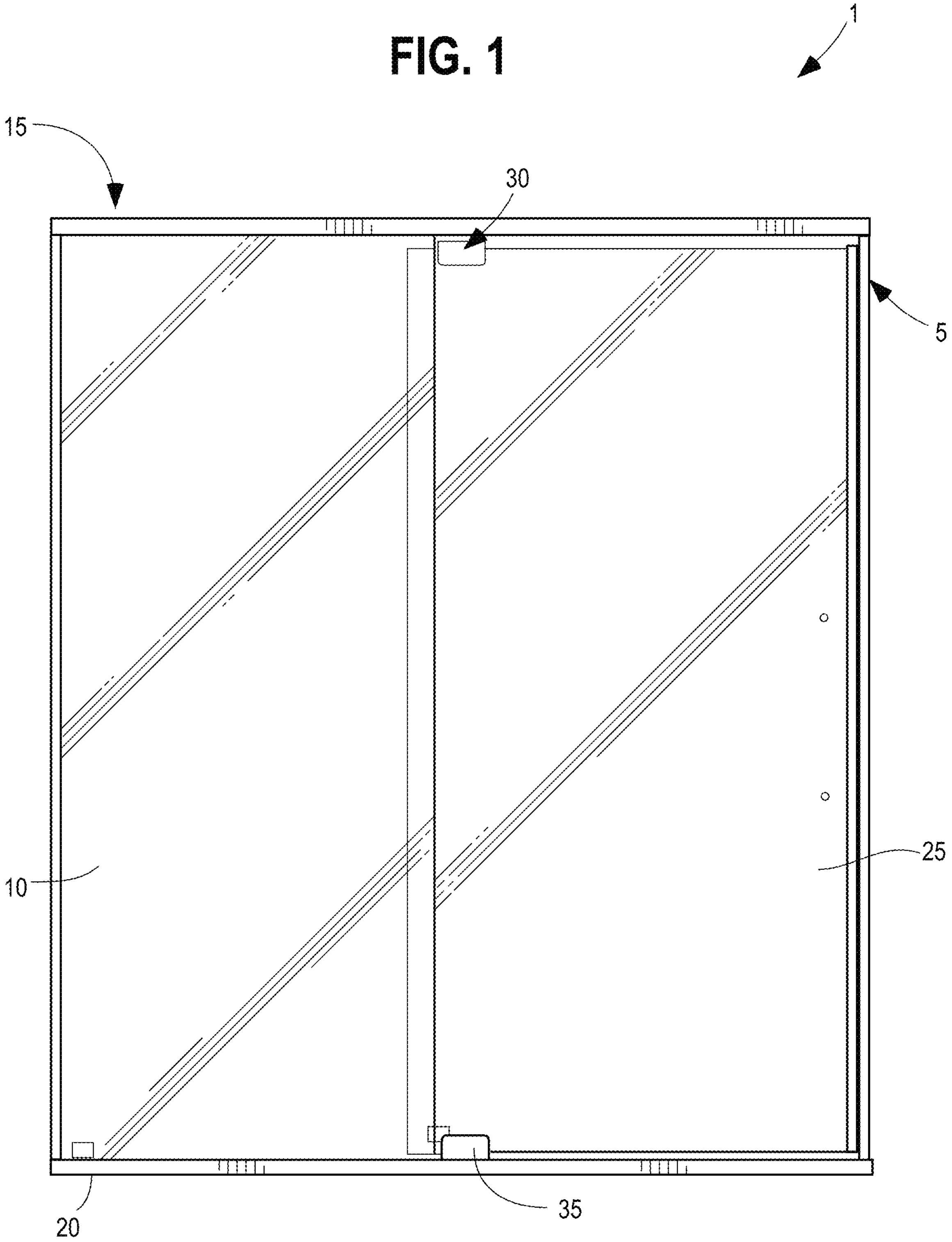
FIG. 1 is a front view of an example pivot door system.

While the disclosure is susceptible to various modifications and alternative forms, a specific embodiment thereof is shown by way of example in the drawings and will herein be described in detail. It should be understood, however, that the drawings and detailed description presented herein are not intended to limit the disclosure to the particular embodiment disclosed, but to the contrary, the intention is to cover all modifications, equivalents, and alternatives falling within the spirit and scope of the present disclosure as defined by the appended claims.

DETAILED DESCRIPTION

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

Turning first to FIG. 1, a pivot door system 1 may include a doorframe 5. The doorframe 5 may house a shower enclosure 10 attached to a header 15 and a footer 20 of the doorframe 5. The shower enclosure 10 may be stationary. A shower door 25 may be positioned to overlap with the shower enclosure 10 on one side of the pivot door system 1, and the shower door 25 may pivot to open. As shown, the shower door 25 overlaps with the shower enclosure 10 on the rear or inner side of the shower enclosure 10. The overlap of the shower enclosure 10 and the shower door 25 may create one way for the shower door 25 to open, which as shown would be outwardly. The overlap may prevent users who are standing on the front or outer side of the pivot door system 1 from moving the shower door 25 the other direction, which as shown would be inwardly. Such users standing on the front or outer side of the pivot door system 1 may move the shower door 25 outwardly in order to pivot the shower door 25 into an open position. The shower enclosure 10 and the shower door 25 may be made of any suitable material, including glass.

The shower door 25 may be coupled to the doorframe 5 via an upper hinge 30 and a lower hinge 35, which each may be separate and distinct components apart from the shower door 25. The upper hinge 30 and the lower hinge 35 may or may not be formed unitary with the shower door 25. In an example embodiment, at least one of the upper hinge 30 and lower hinge 35 may be connected with the shower door 25 via an adhesive, frictional clamping, a pin or bolt extending through the shower door 25, or otherwise. The upper hinge 30 may connect to the header 15, and the lower hinge 35 may connect to the footer 20. The upper hinge 30 may include a soft close mechanism, such that the upper hinge 30 may be configured to prevent the shower door 25 from slamming shut. The lower hinge 35 may also or instead include a soft close mechanism.

Figure 2:
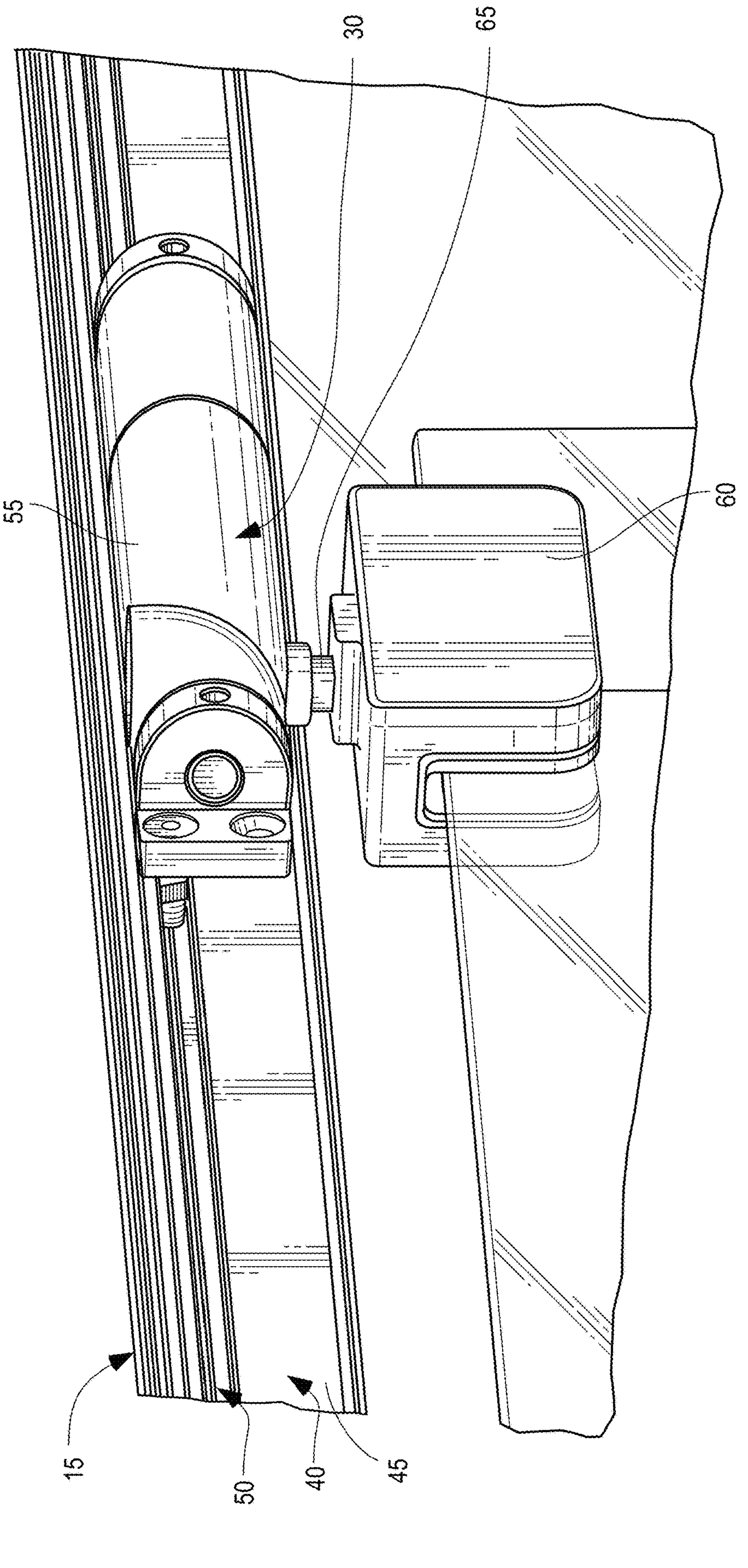
FIG. 2 is a perspective view of an example soft close hinge.

As illustrated in FIG. 2, the header 15 may include a track system 40. The track system 40 may include a primary track 45 and a secondary track 50. The primary track 45 may receive a soft close housing 55 of the upper hinge 30 at multiple positions along the primary track 45. The soft close housing 55 may house the soft close mechanism. The soft close housing 55 may attach to a door connection portion 60 of the upper hinge 30 via a hinge post 65. The hinge post 65 may be configured to allow the door connection portion 60 to rotate and pivot the shower door 25 about the longitudinal axis of the hinge post 65. The hinge post 65 may transfer the soft close motion of the soft close mechanism from within the soft close housing 55 to the door connection portion 60, and ultimately, to the shower door 25. The soft close housing 55, and the soft close mechanism housed therein, may provide the shower door 25 with the ability to close softly.

Figure 3:
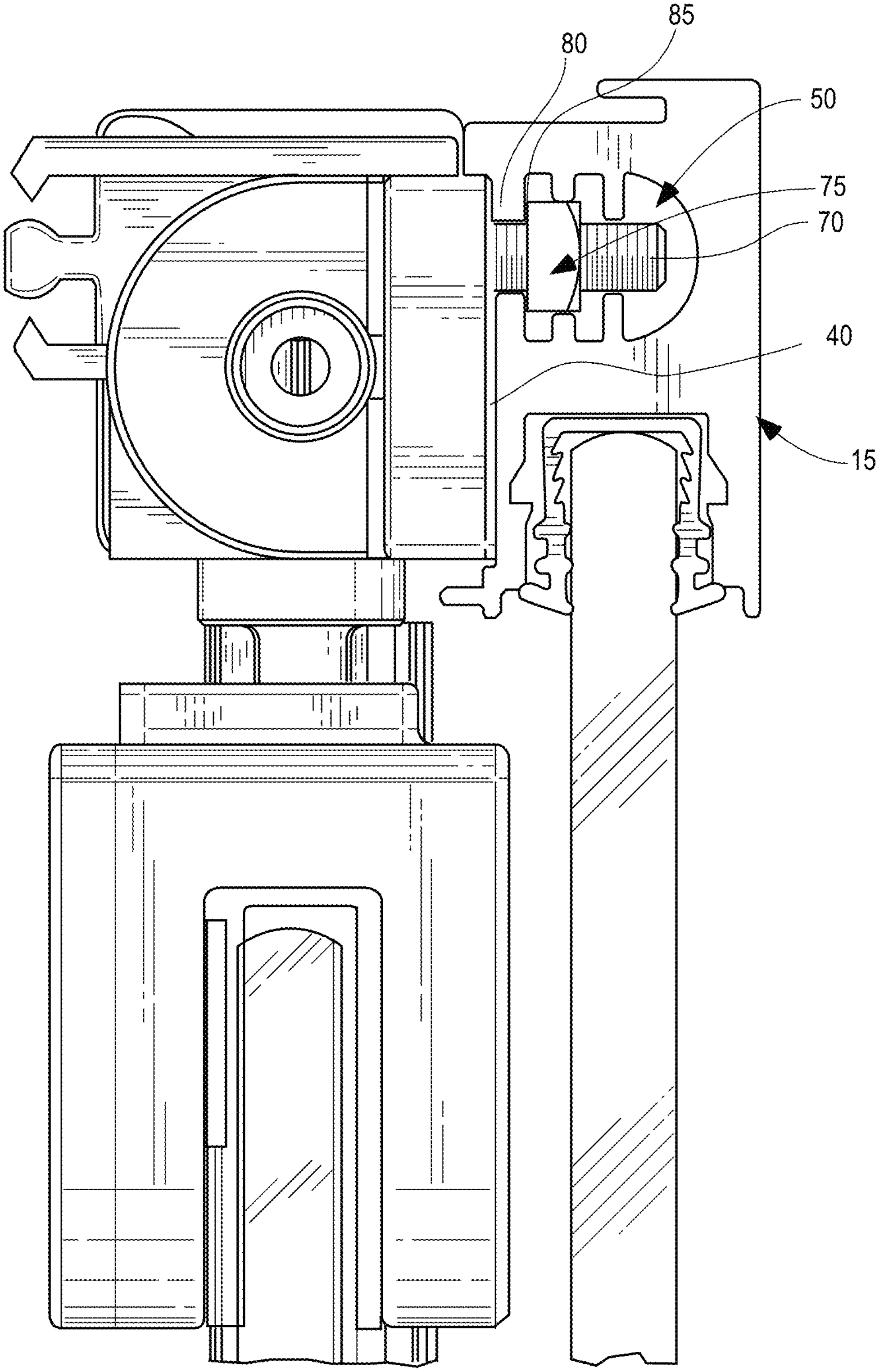
FIG. 3 is a cross-sectional view of the example soft close hinge.

FIG. 3 illustrates the track system 40 of the header 15 in cross-section. The track system 40 may include a secondary track 50. The upper hinge 30 may include a hinge bolt 70 and a hinge nut 75 to attach the upper hinge 30 to the header 15 via the secondary track 50. The hinge bolt 70 may project outwardly from the upper hinge 30 and into the secondary track 50. The hinge bolt 70 may be positioned past a wall 80 of the secondary track 50. The hinge nut 75 may be threaded onto the hinge bolt 70 such that a first side 85 of the hinge bolt 70 is proximate the wall 80.

The hinge nut 75 may be loosened from the hinge bolt 70 in order to permit sliding of the upper hinge 30 along the primary track 45 and secondary track 50 of the track system 40. Once positioned, the hinge nut 75 may again be tightened to secure the upper hinge 30 in place. Alternatively, the upper hinge 30 may be slidable along the track system 40 without loosening the hinge nut 75, such that the hinge nut 75 may retain the upper hinge 30 in place via friction or the like. In either case, the upper hinge 30 may attach to the header 15 at any of a variety of locations on the header 15. The upper hinge 30 may be positioned at any desirable location on the header 15, and such location may depend upon the size of the shower door 25. The upper hinge 30 may be universally positionable on the header 15 and may be positioned to account for the size of the shower door 25. The upper hinge 30 may be used no matter the size of the shower door 25.

The footer 20 may also or instead include a track system like track system 40 in the header 15. The lower hinge 35 may be slidable along such a lower track system and may attach at any of a variety of locations on the footer 20. Such location may depend upon the size of the shower door 25, to allow for the lower hinge 35 and lower track system to be used no matter the size of the shower door 25. The upper hinge 30 and the lower hinge 35 may be positioned at the same lateral coordinates along the header 15 and footer 20, respectively. When positioned in such a manner, the upper and lower edges of the shower door 25 may extend parallel to both the header 15 and the footer 20. However, in another embodiment, the upper hinge 30 and the lower hinge 35 may be positioned at different lateral locations along the header 15 and footer 20, respectively. When positioned in such a manner, the shower door 25 may be intentionally tilted such that the upper and lower edges of the shower door 25 do not extend parallel to the header 15 and footer 20. This may allow the shower door 25 to accommodate an out-of-square or otherwise uneven shower enclosure.

As is evident from the foregoing description, certain aspects of the present invention are not limited by the particular details of the examples illustrated herein, and it is therefore contemplated that other modifications, applications, variations, or equivalents thereof, will occur to those skilled in the art. Many such changes, modifications, variations, and other uses and applications of the present constructions will, however, become apparent to those skilled in the art after considering the specification and the accompanying drawings. In addition, unless mention was made above to the contrary, it should be noted that all of the accompanying drawings are not to scale. All such changes, modifications, variations, and other uses and applications which do not depart from the spirit and scope of the present inventions are deemed to be covered by the inventions which are limited only by the claims which follow.

The invention claimed is:

1. A pivot door system comprising:
- a door;
- a doorframe including a header, the header including a header track system, wherein the header track system includes a track positioned on a lateral side of the header; and
- a first hinge attached to the door, the first hinge including a first soft close mechanism extending laterally outward from the track and engaged with the header track system, the first hinge being securable at a plurality of positions along the header track system.

2. The pivot door system of claim 1, further comprising a shower enclosure at least partially overlapping with the door.

3. The pivot door system of claim 1, further comprising a second hinge attached to the door.

4. The pivot door system of claim 3, wherein the second hinge includes a second soft close mechanism and is engaged with and securable at a plurality of positions along a footer of the doorframe.

5. The pivot door system of claim 4, wherein the first hinge and the second hinge are positioned at the same lateral coordinates along the header and the footer, respectively.

6. The pivot door system of claim 1, wherein the header track system comprises a primary track and a secondary track, and wherein the primary track is configured to receive a soft close housing of the first hinge, which is configured to house the first soft close mechanism.

7. The pivot door system of claim 6, wherein the soft close housing attaches to a door connection portion of the door via a hinge post, wherein the hinge post allows the door connection portion to rotate and pivot the door about a longitudinal axis of the hinge post.

8. The pivot door system of claim 7, wherein the hinge post transfers soft close characteristics of the first soft close mechanism from within the soft close housing to the door via the door connection portion.

9. A pivot door system comprising:
- a doorframe comprising a header and a footer, the doorframe housing a shower enclosure, wherein the shower enclosure is attached to the header and the footer, wherein the header includes a header track system further including a track positioned on a lateral side of the header;
- a shower door at least partially overlapping with the shower enclosure, wherein the shower door is coupled to the doorframe via an upper hinge and a lower hinge;
- wherein the shower door pivots from an open position to a closed position;
- wherein the upper hinge couples to the header at any location along the header, and the lower hinge couples to the footer at any location along the footer;
- wherein at least one of the upper hinge and the lower hinge comprises a soft close mechanism, wherein the soft close mechanism of the at least one of the upper hinge and the lower hinge extends laterally outward from the track.

10. The pivot door system of claim 9, wherein the footer comprises a footer track system.

11. The pivot door system of claim 10, wherein the upper hinge is engaged with and securable at a plurality of positions along the header track system.

12. The pivot door system of claim 10, wherein the lower hinge is engaged with and securable at a plurality of positions along the footer track system.

13. The pivot door system of claim 9, wherein the upper hinge and the lower hinge are positioned at the same lateral coordinates along the header and the footer, respectively.

14. The pivot door system of claim 10, wherein the header track system comprises a primary track and a secondary track, and wherein the primary track is configured to receive a soft close housing of the upper hinge, which is configured to house the soft close mechanism.

15. The pivot door system of claim 14, wherein the soft close housing attaches to a door connection portion of the shower door via a hinge post, wherein the hinge post allows the door connection portion to rotate and pivot the shower door about a longitudinal axis of the hinge post.

16. The pivot door system of claim 15, wherein the hinge post transfers soft close characteristics of the soft close mechanism from within the soft close housing to the shower door via the door connection portion.

17. A pivot door system comprising:
- a pivotable door;
- a doorframe including a header, the header including a track system, wherein the track system includes a track positioned on a lateral side of the header;
- a shower enclosure at least partially overlapping with the door; and
- a hinge attached to the door, the hinge including a soft close mechanism extending laterally outward from the track and engaged with the track system, the hinge being securable at a plurality of positions along the track system.

18. The pivot door system of claim 17, wherein the track system comprises a primary track and a secondary track, and wherein the primary track is configured to receive a soft close housing of the hinge, which is configured to house the soft close mechanism.

19. The pivot door system of claim 18, wherein the soft close housing attaches to a door connection portion of the door via a hinge post, wherein the hinge post allows the door connection portion to rotate and pivot the door about a longitudinal axis of the hinge post.

20. The pivot door system of claim 19, wherein the hinge post transfers soft close characteristics of the soft close mechanism from within the soft close housing to the door via the door connection portion.

* * * * *